L. H. TOLHURST.
CAMERA.
APPLICATION FILED MAY 24, 1917.

1,305,841.

Patented June 3, 1919.
2 SHEETS—SHEET 1.

Inventor
Louis H. Tolhurst
by Graham Harris
Attorneys

L. H. TOLHURST.
CAMERA.
APPLICATION FILED MAY 24, 1917.

1,305,841.

Patented June 3, 1919.
2 SHEETS—SHEET 2.

Inventor
Louis H. Tolhurst
by Graham Harris
Attorneys

UNITED STATES PATENT OFFICE.

LOUIS H. TOLHURST, OF LOS ANGELES, CALIFORNIA.

CAMERA.

1,305,841.           Specification of Letters Patent.      Patented June 3, 1919.

Application filed May 24, 1917. Serial No. 170,659.

*To all whom it may concern:*

Be it known that I, LOUIS H. TOLHURST, a citizen of the United States, residing at Los Angeles, in the county of Los Angeles and State of California, have invented a new and useful Camera, of which the following is a specification.

My invention relates to cameras, being more particularly a camera for use upon aeroplanes or other air navigating devices for the purpose of photographing the earth surface from the aeroplane in such a manner that a complete photographic record may be made of the entire earth surface covered in the flight and a record made on the film of the altitude, time and direction of the aeroplane for each exposure.

I am aware that it is common to take a series of photographs upon a film by intermittently moving and stopping such film and exposing the film during the intervals of rest. In such cameras, however, the period of rest and period of movement of the film bear a certain relation which remains constant during the entire taking of the picture, and is such that the length of time of exposure varies in direct proportion to the time period of film movement.

The object of my invention is to produce a camera which may be used for the purposes described which will take a series of images upon a film so that each succeeding image on the film contains a portion of the preceding image thereon. To accomplish this object, I vary the time period of the dark intervals, that is, the periods between exposures, according to the altitude of the camera when such exposure is made, but the time period of the exposure remains constant regardless of such variation of the dark periods. In carrying this out I have so constructed a camera that the altitude of the aeroplane carrying the camera automatically regulates the length of the dark intervals between exposures.

It is a further object of my invention to mark the film used in the camera with suitable markings to denote the time when the exposure is made, the altitude at which the exposure is made, and the direction in which the machine carrying the camera is moving at the time of the exposure.

It is a further object of my invention to make a camera of the class described which is automatic in action with respect to the time length of the dark intervals, and the marking of the film referred to.

Other objects and advantages will appear hereinafter from the following specification.

Referring to the drawings, which are for illustrative purposes only:

Figure 1:
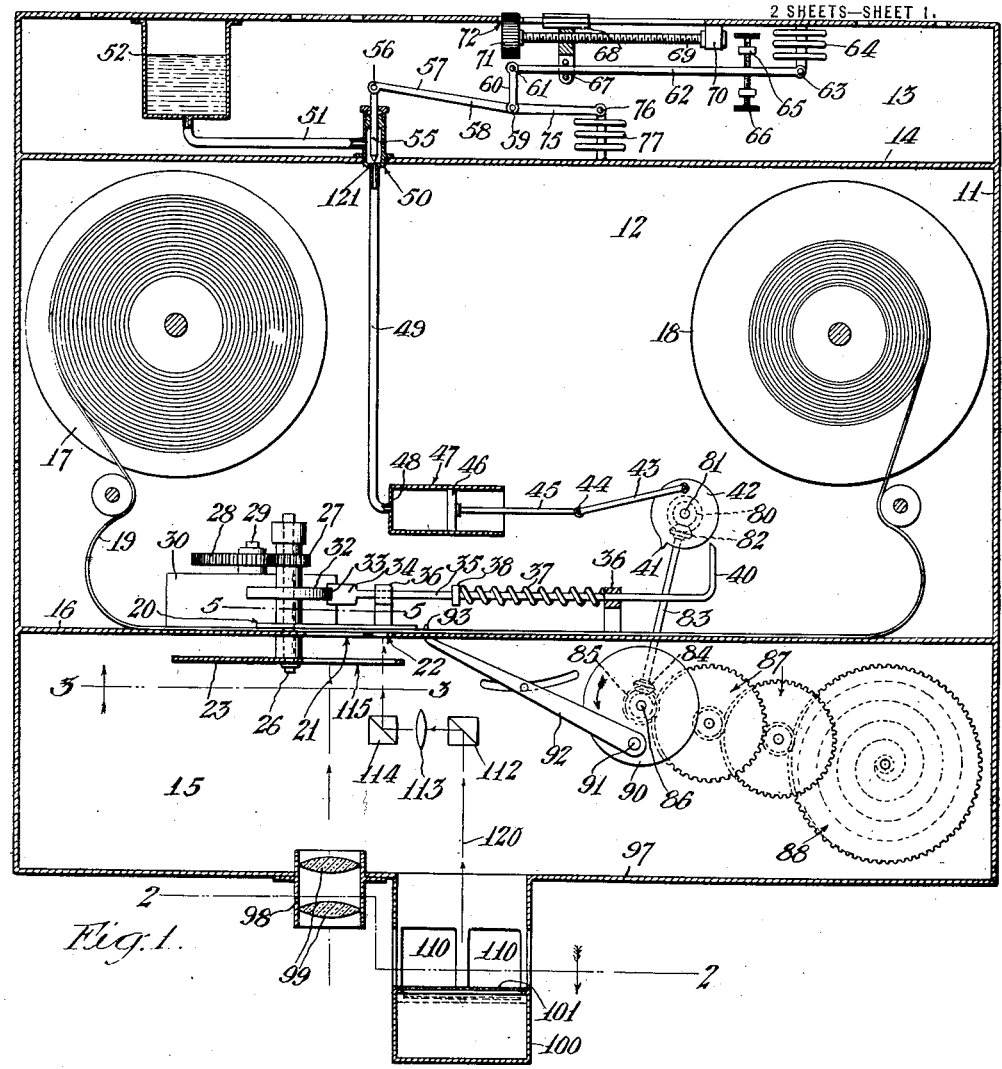
Figure 1 is a diagrammatic view, partly in section, of a camera embodying a form of my invention.

11 designates a camera box having a central chamber 12 constituting a magazine chamber, an upper chamber 13 separated from the central chamber by a wall 14, and a lower chamber 15 divided from the central chamber 12 by a wall or partition 16.

17 designates a loaded film magazine for unexposed film, and 18 designates the take-up magazine for the exposed film, the film 19 passing through a film gate 20 across apertures 21 and 22 formed in the wall 16 directly behind a revolving shutter 23. It is understood that any of the well known forms of mechanism may be used for removing the film from the loaded film magazine 17 and winding the film on the take-up magazine 18 after the same has been exposed. The shutter 23 is mounted on a shaft 26 upon which is secured a gear 27 which meshes with a gear 28 secured to a shaft 29, the shaft 29 being driven by means of any suitable motive power, such as clock mechanism diagrammatically illustrated at 30. Secured to the shaft 26 is a single tooth ratchet wheel 32, the tooth 33 of which is adapted to be engaged by a pawl 34 formed on a rod 35, which rod 35 is slidably mounted in bearings 36, the pawl 34 being elastically held against the face of the ratchet wheel 32 by means of a coil spring 37 which engages a collar 38 secured to the rod 35, the spring 37 acting against one of the bearings or supports 36, as clearly shown in Fig. 1 of the drawing. The outer end of the rod 35 is turned upwardly, as shown in Fig. 1, forming a finger 40, which finger 40 is adapted to be engaged by a tooth 41 formed on the periphery or face of a crank disk 42. Pivotally connected to the crank disk 42 is a crank arm 43 which is pivotally connected at 44 to the end of a piston rod 45 secured to a piston 46 which is adapted to reciprocate in a cylinder 47. The closed end 48 of the cylinder 47 is connected by means of a pipe 49 with a needle valve 50, a pipe 51 connecting the valve 50 with a tank or reservoir 52 adapted to hold a fluid, preferably alcohol, for the purposes hereinafter referred to, it being understood that air or liquid may be used. A needle or valve member 55 is pivotally connected at 56 to the long end 57 of a rock arm 58, the rock arm 58 being pivotally connected at 59 to a link 60 which in turn is pivotally connected at 61 to the short end of a lever 62, the long end of the lever 62 being pivotally connected at 63 to a compensating aneroid 64. The lever 62 is slidably and pivotally connected by means of rollers 67 to a slidable frame 68 mounted in any suitable manner upon the frame of the camera, such frame 68 being adjustable by means of a screw 69 which extends through the frame 68, one end of the screw being rotatably mounted in a bracket 70 and the opposite end of the screw having a knurled head 71 which extends through an opening 72 in the wall of the camera, so that the same may be operated from the exterior of the camera. The short arm 75 of the rock arm 58 is pivotally connected at 76 to an aneroid barometer 77. The crank disk 42 is operated through the medium of a bevel gear 80 secured to a shaft 81 upon which the crank disk 42 is mounted, the gear 80 being driven by means of a similar gear 82 mounted on a shaft 83, the shaft 83 having a bevel gear 84 at its opposite end which meshes with and is driven by a bevel gear 85 mounted upon a shaft 86 driven by means of a train of gears 87 from a driving source which, in the present instance, is diagrammatically illustrated at 88 as a coil spring. Secured to the shaft 86 is a disk 90 which is pivotally connected by means of a pin 91 to claws 92, which are provided with fingers 93, extending into the perforations along the edge of the film for the purpose of moving the film, such portion of the mechanism being any of the well known forms used in motion picture cameras.

Mounted on the lower wall 97 of the camera is a lens box 98 having therein a suitable lens 99 which lies in the optical axis of the aperture 21, it being understood that the lens 99 is permanently fixed so that it remains constantly in universal focus with the film 19.

Figure 2:
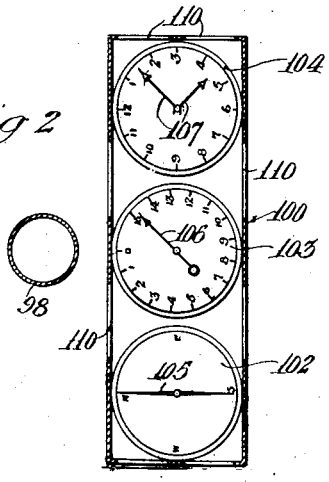
Fig. 2 is a section on line 2—2, Fig. 1.
Figure 3:
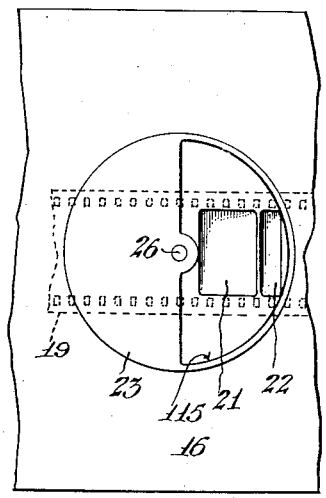
Fig. 3 is a sectional view on line 3—3 Fig. 1, looking in the direction of the arrow.
Figure 4:
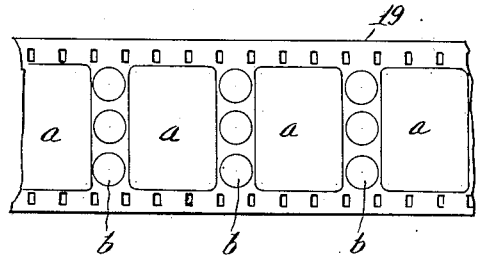
Fig. 4 is a diagrammatic view of a portion of the film.

100 designates a housing or case which extends across the bottom of the camera, as shown in Figs. 1 and 2, such housing 100 having a glass plate 101 mounted therein, under which is arranged three instruments, to-wit, a compass 102, an aneroid barometer 103, and a clock 104, each having a dial, on which is respectively shown a needle 105 for the compass 102, an arm 106 for the aneroid 103, and clock hands 107 for the clock 104. The housing 100 above the glass plate 101 is provided with a series of openings 110 through which light is permitted to strike the dials of the respective instruments, the light from the faces of which is reflected successively through prisms 112, a lens 113, prisms 114, through the aperture 115 in the shutter, and through the aperture 22 in the wall 16 against the film exposed through the aperture 22, such reflected image following the course diagrammatically illustrated by the dotted line 120 in Fig. 1.

The camera is used in the following manner:

The camera is hung in suitable mechanism upon the aeroplane with the lens 99 pointing vertically downward, as shown in Fig. 1 of the drawings, the camera being suitably mounted and weighted as will be readily understood by any one skilled in the art, so that regardless of the pitch or angle of the aeroplane the optical axis of the camera remains perpendicular at all times.

It is essential that the needle 55 of the valve 50 be in the same position at the commencement of each flight of the machine, regardless of atmospheric conditions, which adjustment is made by the compensating action of the aneroids 64 and 77 acting through the rock arm 58, link 60 and lever 62, and when such adjustment is made set screws 65 and 66 are brought into contact with the lever 62, after which the aneroid 77 controls the operation of the needle 55 during the flight, as hereinafter referred to.

As the aeroplane leaves the ground, the motor 88 is started in motion, and through the medium of the train of gears 87 and shaft 83 the crank disk 42 is driven in the direction of the arrow shown in Fig. 1. The speed of movement of the crank disk is regulated against the driving mechanism just referred to by means of the piston 46 reciprocating in the cylinder 47 against the fluid therein passing through the valve 50, the passage of the fluid through the valve 50 being controlled by the position of the needle 55 which is controlled by means of the aneroid 77 through the mechanism heretofore described. Such mechanism operates the needle 55 to approach the valve seat 121 as the aeroplane rises to a higher altitude, thereby restricting the flow of fluid to the valve and consequently causing a slower movement of the piston 46 in the cylinder 47, it being understood that the needle 55 at lower altitude is farther away from its seat 121, thereby permitting a freer passage of the fluid through the valve and a freer or quicker movement of the piston 46, in the cylinder 47, thereby controlling the speed of rotation of the crank disk 42 and consequently the length of time between exposures.

As the crank disk 42 rotates, the tooth 41 engages the finger 40 on the rod 35 thereby moving the rod to disengage the pawl 34 from the tooth 33 on the ratchet wheel 32, thereby permitting movement of the shaft 26 and a rotation of the shutter 23 to expose the film. As soon as the tooth 41 passes the finger 40, the rod 35 is immediately moved by the action of the spring 37, so that the pawl 34 comes into engagement with the face of the ratchet wheel 32 and catches the tooth 33 thereon, retaining the same and arresting movement of the shutter until the tooth 41 has made an entire revolution and again come in contact with the finger 40, when the operation is repeated. During the movement of the crank disk 42, after the tooth has passed the finger 40, and until the tooth 41 again engages the finger 40, the claws 92 are operated through the train of gears 87 to move the film, and during such movement it is understood that the shutter 23 covers the apertures 21 and 22 in the wall 16. During the instant of exposure it is understood that the aperture 115 in the shutter causes the image from the lens 99 and lens 113 to be projected through the apertures 21 and 22 respectively in the wall 16 onto the film 19, the result being a series of exposures $a$ upon the film 19, having between each exposure $a$ an exposure $b$ made through the aperture 22, the exposure $a$ being a negative image of the ground within the optical field of the lens 99, and the exposure $b$ being a negative of the dials of the compass, the aneroid, and clock, at the instant the exposure $a$ is made.

Figure 6:
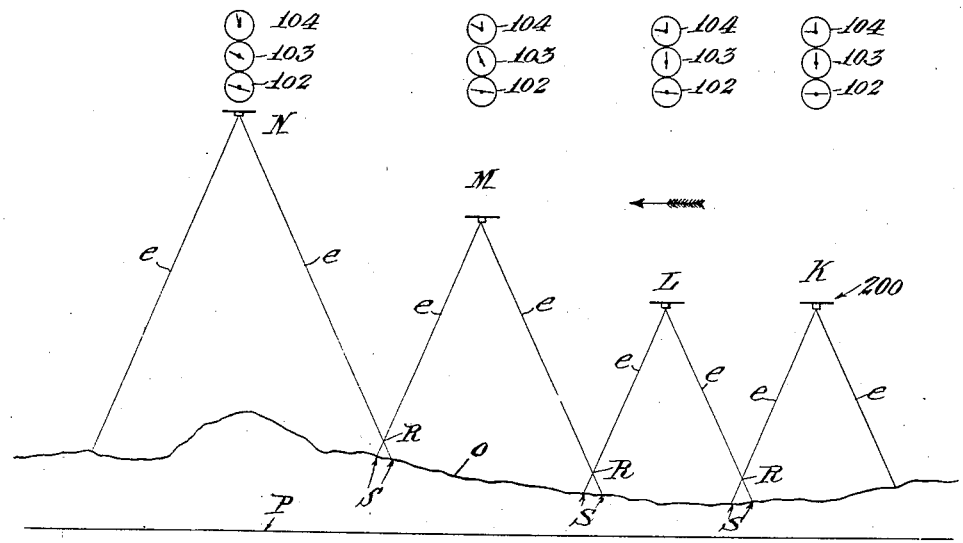
Fig. 6 is a diagrammatic view illustrating the areas covered by exposures at different altitudes of the machine carrying the camera.
Figure 5:
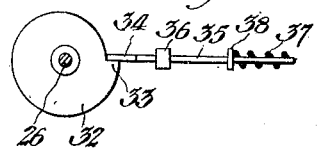
Fig. 5 is a sectional view on line 5—5 Fig. 1.

The length of the area of the earth's surface included in each exposure is illustrated in Fig. 6, the aeroplane indicated at 200 being shown diagrammatically at different elevations, and the lines $e$ indicating the angle boundary of the optical field of the camera at the various heights indicated.

Assuming that the aeroplane is traveling in the direction of the arrow shown in Fig. 6, four positions of the aeroplane in flight are indicated at K, L, M and N respectively, the earth's surface by a line O, and sea level by the base line P.

The aeroplane in positions K and L is at the same altitude and the intervals between exposures is the same. As the aeroplane reaches the position indicated at M the aeroplane is at a higher altitude than when at L. Consequently the time between the exposure at L and M has increased, as indicated by the increase in distance between the positions L and M. The same applies to the positions M and N as just described with relation to the positions indicated at M and L. It is to be noted that the angle boundary lines $e$ of each position overlap, as indicated at R, so that each succeeding negative bears a portion indicated at S shown on the preceding negative.

As each exposure is made it is understood that the dials of the clock 104, compass 102 and aneroid 103 are photographed on the negative and a record made on the film showing the altitude at the time of exposure. The time the exposure is made, and the direction of travel of the aeroplane, when taken together in connection with the photographed earth's surface, form a continuous record and picture of the flight.

I claim as my invention:—

1. In a camera for air craft, film guiding means, means for intermittently moving the film, means for intermittently exposing successive portions of the film, and fluid means for automatically varying the length of the time intervals between exposures according to the altitude of the camera.

2. In a camera for air craft, film guiding means, exposing means for successively exposing portions of the film, a barometer, and means operated by the barometer adapted to vary the time intervals between exposures.

3. In a camera for air craft, film guiding means, a shutter, operating means for the shutter, means for arresting movement of the shutter, means for releasing said arresting means to permit the shutter to expose the film, a barometer, means operated by the barometer adapted to time the action of the releasing means according to the altitude of the camera, and means for moving the film between exposures.

4. In a camera for air craft, film guide means, an aperture plate, a shutter, means for operating the shutter to expose the film, means for arresting the movement of the shutter to cause dark intervals between exposures, means for releasing said arresting means, means for operating said releasing means, braking means for said operating means, a barometer and means operated by said barometer for varying the action of the braking means according to the altitude of the camera.

5. In a camera for air craft, film guide means, a wall having an aperture therein, a shutter in front of said aperture, means for rotating said shutter, a pawl adapted to arrest the movement of the shutter, releasing means for said pawl, driving means for intermittently operating said releasing means, a fluid cylinder, a piston in said cylinder connected to the driving means, a fluid reservoir, connections between said reservoir and the cylinder, valve means for controlling the flow of fluid from and to the cylinder from the reservoir, and a barometer connected to said valve adapted to operate the same.

6. In a camera for air craft, film guide means, a wall having an aperture therein, a shutter, means for rotating the shutter, a fluid cylinder, a piston therein, a fluid reservoir, a connection between said reservoir and cylinder, a valve in said connection, barometric controlling means for said valve, releasing means for said shutter, and means for connecting said piston to said releasing means.

7. In a camera for air craft, film guide means, means for intermittently moving the film, a shutter arranged to expose the film between the intervals of movement of the same, means for throwing a photographic image of an object on the film and simultaneously making a photographic image on the film of identifying data, and means for varying the time between exposures, said means consisting of shutter releasing mechanism, motive means for operating said releasing mechanism, means for varying the speed of said motive means, said last named means consisting of fluid regulating means, and barometric means for controlling said fluid means.

8. In a camera for air craft, film guiding means, exposing means for successively exposing portions of the film, a barometer, means operated by the barometer adapted to vary the time intervals between exposures, and means for projecting identifying images on the film at each exposure, said identifying means consisting of images of instrument dials.

9. In an air craft camera for taking a series of pictures during a flight, a film, a shutter means for operating the shutter to expose successive portions of the film, means for moving the film between exposures, means for projecting the image of an object on the film between exposures, and means for regulating the operation of the shutter to time the exposures so that a portion of each image appears in the next successive image regardless of the height of the air craft from the ground.

In testimony whereof I have hereunto set my hand at Los Angeles, California, this 17th day of May, 1917.

LOUIS H. TOLHURST.